United States Patent Office 3,450,560
Patented June 17, 1969

3,450,560
ALUMINUM ARTICLE COVERED BY MALEIC ANHYDRIDE MODIFICATION POLYMERS
Robert Bacskai, Berkeley, Calif., assignor to Chevron Research Company, a corporation of Delaware
No Drawing. Filed July 3, 1963, Ser. No. 292,748
Int. Cl. B44d 1/36
U.S. Cl. 117—132                7 Claims This invention concerns modification of hydrocarbon polymers with maleic anhydride. More specifically, this invention concerns compositions containing maleic anhydride modified hydrocarbon polymers of α-olefins and methods for their preparation.

Hydrocarbon polymers, that is, polymers of hydrocarbon α-olefins, have found wide exploitation in commerce. The range of utilities for hydrocarbon polymers has been greatly expanded by using low pressure or "Ziegler-type" polymerizations for their preparation. While in many instances, the polymers are satisfactory as formed, modification of the polymer is required in a wide range of applications.

Because of the non-polar nature of the hydrocarbon polymer, the polymers are very reluctant to form strong bonds with polar materials. Adhesion to various surfaces is usually a problem, the polymers only weakly adhering, if at all. Dyeability is also a problem because most dyes are polar in character. The hydrocarbon nature of the polymer does not have a strong attraction for the polar dye. These, however, are only a few of the problems involved in attempting to extend the usefulness of the hydrocarbon polymers.

Many methods have appeared for modifying the polymers and extending their usefulness. Physical treatments have been employed, such as bombarding with high energy particles or treatment with electrical discharge. Chemical means have also been used, particularly halogenation with chlorine or bromine, either light catalyzed or free-radical catalyzed. Most of these treatments have been directed toward improving the dyeability of the hydrocarbon polymer.

It has now been found that the adhesive quality of saturated hydrocarbon polymers, as well as other properties dependent on the polar nature of the polymer, can greatly be enhanced by modifying tactic hydrocarbon polymers with small amounts of maleic anhydride. The maleic anhydride appears as side chains on the polymer. The maleic anhydride can be introduced into the already formed polymer by use of free-radical catalysts. The method employed is to swell or dissolve the polymer with an inert solvent, and then heat the swelled polymer in the presence of a free-radical catalyst and maleic anhydride at a temperature which provides a reasonable rate of decomposition of the free-radical catalyst.

The common hydrocarbon polymers are those prepared of α-olefins of from 2 to 10 carbons, e.g., ethylene, propylene, 1-butene, 4-methylpentene-1, octene-1, etc. The polymers may be tactic homopolymers or copolymers. Preferred hydrocarbon polymers are those having from 3 to 6 carbons, e.g., propylene, butene-1, pentene-1, hexene-1, 3-methylpentene-1, 4-methylpentene-1, etc. Particularly preferred are polymers having at least 70% by number of propylene.

The tactic polymers are almost invariably prepared under relatively low pressures, e.g., 1 to 200 atmospheres, and with a combination of metal catalysts. One catalyst compound is an organo-metallic compound having a Group III metal of the Periodic Table, e.g., boron or aluminum, the organo-metallic compound either being preformed or formed in situ. However, organo-metallic compounds of metals of Groups I and II of the Periodic Table have also found use.

A second component is generally a transition state metal compound. Usually, halides or alkoxides are used, but other compounds also find application. The preferred metals are titanium and vanadium.

Stereoregular addition polymerization has been reviewed in Linear and Stereoregular Addition Polymers, Interscience Publishers, N.Y., 1959, by Norman G. Gaylord and Hermann F. Mark. Discussion of the catalysts is found in Chapter VII, beginning on p. 87, while the polymeric structure is described in Chapter V, beginning on p. 45.

The polymers will generally have an intrinsic viscosity of at least 1.0, more usually 1.5, and preferably 2.0. Polymers having intrinsic viscosities significantly exceeding 6 are usually only difficultly swellable and to that degree are undesirable. The product will generally have a somewhat lower intrinsic viscosity than the starting material, usually in the range of 0.75 to 5.0. (Intrinsic viscosity $[\eta]$=deciliters/gram at 135° C. in Decalin.)

The molecular weight of the hydrocarbon polymers will usually be at least 50,000 and more usually 100,000. Rarely will the average molecular weight exceed 500,000.

The solvents used are inert solvents which will satisfactorily swell the polymer. Hydrocarbon and halohydrocarbon solvents are preferred, particularly aromatic solvents. Solvents include benzene, halobenzenes, such as fluorobenzene, chlorobenzene, bromobenzene (halogens of atomic number 9–35), alkylbenzenes which do not have a benzylic hydrogen, such as tertiary-butylbenzene, benzonitrile, as well as other inert aromatic solvents. The solvents will generally be of from 6 to 12 carbon atoms. The limits to the solvent are that it be able to at least swell the polymer and that it not readily react with either maleic anhydride, the free-radical catalyst or the polymer under the reaction conditions.

The catalyst may be any compound which provides a source of free radicals and is soluble in the reaction medium. These include azo compounds, peroxidic compounds, etc. Preferred compounds are peroxidic compounds. Included by the term peroxidic are both hydroperoxide and peroxide compounds. Illustrative of peroxidic catalysts are hydroperoxides, diaralkylperoxides, diacylperoxides, dialkylperoxides, cyclic peroxides, etc. Specific compounds are dibenzoylperoxide, cumylhydroperoxide, 1-tetralylhydroperoxide, tertiary-butylhydroperoxide, dicumylperoxide, di - t - butylperoxide, dilauroylperoxide, etc. Particularly preferred are the hydroperoxides, such as cumylhydroperoxide, tertiary-butylhydroperoxide, 9-decalylhydroperoxide, etc.

The modification of the polymer with maleic anhydride can be carried out in the presence of air, but preferably in an inert atmosphere. Included among inert atmospheres are nitrogen, helium, etc. If desired, the refluxing solvent can act as a protective blanket over the system.

The temperature will depend on the particular catalyst and solvent chosen. It is preferred to carry out the reaction at autogenous pressures and the desired temperature should not be above the boiling point of the solvent. However, this is a matter of expediency and high or low pressures may be used and solvents of varying boiling points used accordingly. The temperatures will usually be in excess of 50° C. and preferably will be in the range of about 75° to 175° C. Catalysts which decompose at reasonable rates in the range of about 75° to 150° C. will customarily be chosen. Particularly preferred are those catalyst which have reasonable rates of decomposition in the range of about 90° to 150° C.

The amount of maleic anhydride introduced in the polymer is very small. The amount of maleic anhydride used when introducing the maleic anhydride into the polymer will usually be about 0.002 part per part of polymer and preferably at least about 0.005 part. Rarely will the amount of maleic anhydride exceed 1 part per part of polymer and preferably will not exceed 0.5 part.

The amount of catalyst will usually vary from about 0.2 part to 5 parts per part of maleic anhydride. More usually, it will be in the range of about 0.4 to 3 parts. The amount of solvent used will be at least in the range of about 1 part per part of polymer. More usually, there will be at least 5 parts per part of polymer, the range being from about 5 to 50 parts per part of polymer.

The time for the reaction will generally be the time necessary for at least 10% decomposition of the peroxide. Rarely will the time be much less than about 5 minutes; however, shorter times may be used by using gross amounts of initiator. Usually, the time will be in the range of about 15 minutes to 6 hours. The time and temperature will be chosen so that at least 10% and preferably at least 25% of the catalyst has decomposed. Depending on the rate of decomposition, the amount of catalyst decomposed will usually be in the range of about 15 to 75%.

The final polymeric product will have less than about 0.01% by weight of maleic anhydride. The maleic anhydride will be randomly distributed. Usually, the amount of maleic anhydride will be in the range of about .0001 to .005% by weight. While more maleic anhydride than 0.01% can be introduced, it is not necessary for good adhesion.

The modified polymer is found to have good adhesion to a variety of materials, such as glass, aluminum, etc., materials to which the unmodified polymers adhere only poorly, if at all.

2.6, Flow Rate (F.R.)=3.5) were mixed with 100 ml. of benzene. The mixture was stirred and refluxed under nitrogen atmosphere for 2 hours and 20 minutes. It was poured into methanol and filtered. The polymer was extracted with methanol in a Soxhlet extractor for 6 hours. The polymer recovered weighed 4.9 grams, $[\eta]=2.1$. Films were molded from the polymer between aluminum foils. The films adhered very strongly to the aluminum and could be separated only by dissolving the metal in dilute acid.

EXAMPLE II

One gram of maleic anhydride, 2 ml. cumene hydroperoxide and 50 grams of polypropylene ($[\eta]=2.6$, F.R.=3.5) were mixed with 500 ml. chlorobenzene and refluxed for 2 hours. The mixture was cooled and the polymer precipitated with methanol. A portion of the polymer was redissolved in 500 ml. hot chlorobenzene and reprecipitated with methanol to ensure the complete removal of any free maleic anhydride.

Twenty mil films were pressed from the two samples and their differential infrared spectrum determined (comparing films of treated and untreated polypropylene) in the carbonyl region at 1720 and 1790 cm.$^{-1}$. The percent CO in both samples (original and reprecipitated) was 0.0012% by weight. Both samples adhered well to aluminum foil.

When similar experiments were carried out in the absence of either benzoyl peroxide or maleic anhydride, the films obtained did not strongly adhere to the aluminum foil after molding.

The following table is a series of experiments which were carried out in accordance with Example I. They are provided in tabular form for convenience.

TABLE I

| Solvent [1] | Ml. | Catalyst [2] | Amount, g. or ml. | Maleic anhydride, g. | Polypropylene, g. | Time, hrs. | Temp., °C. | [η] [3] Orig. | [η] [3] Final | Adhesion [4] to aluminum |
|---|---|---|---|---|---|---|---|---|---|---|
| CB | 100 | t-BH | 0.50 ml | 1 | [5] 5 | 2 | 132 | 2.6 | 0.95 | G |
| CB | 100 | t-BH | 0.25 ml | 0.5 | 5 | 2 | 132 | | | G |
| CB | 100 | t-BH | 0.25 ml | 0.25 | 5 | 2 | 132 | 2.6 | 1.2 | G |
| CB | 100 | CH | 0.25 ml | 0.25 | 5 | 2 | 132 | 2.6 | 1.9 | G |
| CB | 100 | CH | 0.3 ml | 0.1 | 5 | 2 | 132 | 2.6 | 1.9 | G |
| CB | 100 | CH | 0.1 ml | 0.05 | 5 | 2 | 132 | | | G |
| CB | 100 | CH | 0.05 ml | 0.01 | 5 | 2 | 132 | 2.6 | 2.2 | M-P |
| CB | 100 | CH | 0.1 ml | 0.05 | 10 | 2 | 132 | 2.6 | 1.9 | G |
| CB | 500 | CH | 0.5 ml | 0.25 | 50 | 2 | 132 | 2.6 | 2.2 | [8] G |
| CB | 1,000 | CH | 1.0 ml | 0.5 | 100 | 2 | 132 | 2.6 | 2.1 | G |
| CB | 200 | CH | 0.1 ml | 0.05 | 20 | 2 | 132 | 2.6 | 2.2 | P |
| CB | 1,000 | CH | 1.0 ml | 0.5 | 100 | 2 | 132 | 2.6 | 2.2 | [7] G |
| CB | 1,000 | CH | 1.0 ml | 0.5 | [6] 100 | 2 | 132 | 4.5 | 3.5 | [7] G |
| CB | 100 | CP | 0.10 ml | 0.05 | [5] 5 | 2 | 132 | 2.6 | | G |
| B | 100 | BzP | 1 g | 2 | 5 | 2 | 80 | 2.6 | 2.1 | G |

[1] B=benzene; CB=chlorobenzene.
[2] t-BH=tert.-butyl hydroperoxide; CH=cumene hydroperoxide; CP=dicumyl peroxide; BzP=dibenzoyl peroxide.
[3] [η]=intrinsic viscosity in decalin at 135° C.
[4] G=good; M=moderate; P=poor. Films were prepared as described in Example I, and the degree of adhesion observed and estimated.
[5] Commercial Grade Polypropylene, Flow rate of 3.5, M.P. 168° C.
[6] Commercial Grade Polypropylene, Flow rate of 0.3, M.P. 168° C.
[7] Sample showed 0.0006% by weight of CO as measured by differential infrared analysis.
[8] The physical properties of the polypropylene were determined before and after treatment with maleic anhydride. Both samples were stabilized with DLTDP (dilauryl thiodipropionate) and BHT (2,6-di-tert.-butyl-3-methylphenol). See the following table:

| | Polypropylene | |
|---|---|---|
| | Untreated | Treated |
| Melt flow rate (N$_2$, 230° C., 2,160 g.) [a] | 3.10 | 7.5 |
| Brittle point, ° C. [b] | +26.5 | +20.5 |
| Tensile impact, ft. lb./in.$^2$ [c] | 21.2 (cavitation) | 19.1 (cavitation) |
| Tensile undrawn: [d] | | |
| Initial modulus, p.s.i. | 103,300 | 122,700 |
| Yield, point, p.s.i. | 3,357 | 4,112 |
| Break point | No break, 1,500 plus elongation | No break, 1,500 plus elongation |

It is evident that the treatment resulted in improved strength charateristics, as well as imparting adhesiveness to the polymer.

The test procedures are standard as reported by the American Society for the Testing of Materials: a=ASTM D 1238-57T; b=ASTM D 746-57T; c= ASTM D 1822-61T; d=ASTM D 638-61T.

The following examples are offered by way of illustration and not by way of limitation.

EXAMPLE I

Two grams of maleic anhydride, 1 gram of benzoylperoxide and 5 grams of polypropylene powder ($[\eta]=$ The compositions using the modified polypropylene can be prepared in a variety of ways. The material to be covered, such as glass, or aluminum, may be pressed together with the polymer above its melting point to form a coating of a desired thickness. The polymer can be dissolved in a variety of solvents and sprayed onto the surface of the material to be covered. The methods of preparing a film of a polymer on different material are well known in the art and do not require elaboration. The films of the polymer will usually vary in a thickness of from about 0.2 mil to 5 mils, but this is one of expediency and is not essential to the novel character of the compositions of this invention.

The modified polymers also show improved dyeability. The polymer prepared in Example I was treated with Methylene Blue and Deorlene Blue (Ciba's acrylic dye) in the following manner:

One-half gram polypropylene powder was dispersed in water in the presence of a non-ionic detergent. A dye solution (5 ml. Methylene Blue; 2 ml. Deorlene Blue) was added and the mixture made up with water to 100 ml. The bath temperature was slowly raised to boiling (approximately 15 minutes) and boiled for one hour. The samples were then rinsed and dried. Both samples showed superior coloration than obtained in the absence of maleic anhydride treatment.

As will be evident to those skilled in the art, various modifications on this process can be made or followed, in the light of the foregoing disclosure and discussion, without departing from the spirit or scope of the disclosure or from the scope of the following claims.

I claim:
1. An article comprising aluminum covered at least in part with a film of a product prepared by contacting a hydrocarbon polymer of mono-α-olefin monomers of from 2 to 10 carbon atoms with at least sufficient inert solvent to swell said polymer, a free radical catalyst and maleic anhydride at a temperature in the range of 50° C. to 175° C. for a period of time in which at least 10% of the catalyst is decomposed, wherein there is at least 0.002 part of maleic anhydride per part of polymer and at least about 0.2 to 5 parts of catalyst per part of maleic anhydride, said product having a lower intrinsic viscosity than said polymer.

2. Product of claim 1 wherein the temperature range is about 75° C. to 150° C.

3. Product of claim 1 wherein there is about 0.005 to 1 part maleic anhydride per part of polymer.

4. Product of claim 1 wherein there is about 0.4 to 3 parts catalyst per part of maleic anhydride.

5. Product of claim 1 wherein said polymer has an intrinsic viscosity in the range of about 1 to 6.

6. Product of claim 1 wherein the catalyst is a peroxidic catalyst.

7. Product of claim 1 wherein the polymer is polypropylene.

References Cited

UNITED STATES PATENTS

| | | | |
|---|---|---|---|
| 2,973,344 | 2/1961 | Fasce | 260—78.40 |
| 2,976,204 | 3/1961 | Young et al. | |
| 3,012,020 | 12/1961 | Kirk et al. | |
| 3,242,121 | 3/1966 | Hill. | |
| 3,071,858 | 1/1963 | Alter. | |
| 3,106,485 | 10/1963 | Guillet et al. | |

OTHER REFERENCES

Raffel Allison: Polyethylene, High Polymers, vol. XI (1956), pp. 137, 141, 142.

Sherwood, Metal Finishing, July 1963, pp. 45–47.

JOSEPH L. SCHOFER, *Primary Examiner.*

L. EDELMAN, *Assistant Examiner.*

U.S. Cl. X.R.

117—124; 260—78, 93.7, 94.9